United States Patent [19]
Trbovich

[11] Patent Number: 5,955,943
[45] Date of Patent: Sep. 21, 1999

[54] TURN SIGNAL AND BRAKE SIGNAL COMBINATION

[76] Inventor: Jeffrey Alan Trbovich, 124 Longvue Dr., McMurray, Pa. 15317

[21] Appl. No.: 09/017,031
[22] Filed: Feb. 2, 1998
[51] Int. Cl.⁶ .................................................. B60Q 1/34
[52] U.S. Cl. ...................... 340/475; 340/468; 340/458; 307/10.8
[58] Field of Search ................................. 340/475, 468, 340/469, 470, 458, 431, 472; 307/10.8

[56] References Cited

U.S. PATENT DOCUMENTS

| | | | |
|---|---|---|---|
| 3,883,845 | 5/1975 | DeVita | 340/475 |
| 3,970,860 | 7/1976 | Purdy | 340/477 |
| 4,845,465 | 7/1989 | Kruse et al. | 340/468 |
| 5,264,827 | 11/1993 | Giovanni | 340/477 |

*Primary Examiner*—Jeffery A. Hofsass
*Assistant Examiner*—Julie B. Lieu
*Attorney, Agent, or Firm*—William L. Krayer

[57] ABSTRACT

A brake and turn signal circuit permits a brake lamp to be used as a turn signal when both the brakes and turn signal are applied.

4 Claims, 2 Drawing Sheets

5,955,943

TURN SIGNAL AND BRAKE SIGNAL COMBINATION

TECHNICAL FIELD

This invention relates to a system and circuit for turn signals and brake lamps, as applied to motorcycles and other vehicles. In the system, a lamp which is normally a brake lamp is used for a turn signal while permitting other brake lamps to function. A pulse turn signal current impedes the passage of current for normal operation of the brake lamp while the turn signal operates.

BACKGROUND OF THE INVENTION

The present inventor has observed that brake and turn signal displays of motorcycles are not as readily visible as could be the case. Many motorcycles have only a single brake lamp on the fender and auxiliary brake lights in the higher mounted trunk, and the turn signals often are low and difficult to see. It therefore would be desirable to utilize them in an efficient manner to achieve maximum notice. In practice, this means combining the functions of the two types of lamps in one way or another.

In U.S. Pat. No. 5,028,908, Juang discloses a control circuit for vehicle taillights in which the turn signal lights are utilized to provide extra signals when the brake is applied.

Heidman, in U.S. Pat. No. 4,638,296, flashes a brake lamp alternately with a turn signal lamp when the brake is not activated but the turn signal is.

These and other prior patents do not provide a maximum degree of safety for the user.

SUMMARY OF THE INVENTION

My invention is a system and circuit for utilizing a lamp which is normally a brake lamp as a turn signal lamp even when the brakes are applied at the same time as the turn signal.

For the brake signal of a motorcycle, I provide a central brake lamp and an auxiliary brake lamp on each side of the rear of the motorcycle, preferably on the trunk. For signaling a turn, I provide a standard turn signal lamp on each side of the motorcycle, and means for temporarily converting the appropriate auxiliary brake lamp into a turn signal lamp when a turn signal is applied. If the brakes are applied at the same time as the turn signal, the central brake lamp operates and also the auxiliary brake lamp on the side opposite the turn will operate, while the other auxiliary brake lamp performs as a turn signal.

My invention will be discussed with particular reference to a motorcycle, but it should be understood that the same principles can be applied to other vehicles such as automobiles and trucks. While the motorcycle is discussed with reference to a central brake lamp, the reader will readily realize that a larger vehicle may use two such brake lamps which may be operated simultaneously, and that this is contemplated within my invention. Likewise a motorcycle may have several brake lamps, but only one on each side will normally be used as a turn signal.

DETAILED DESCRIPTION OF THE INVENTION

Figure 1:
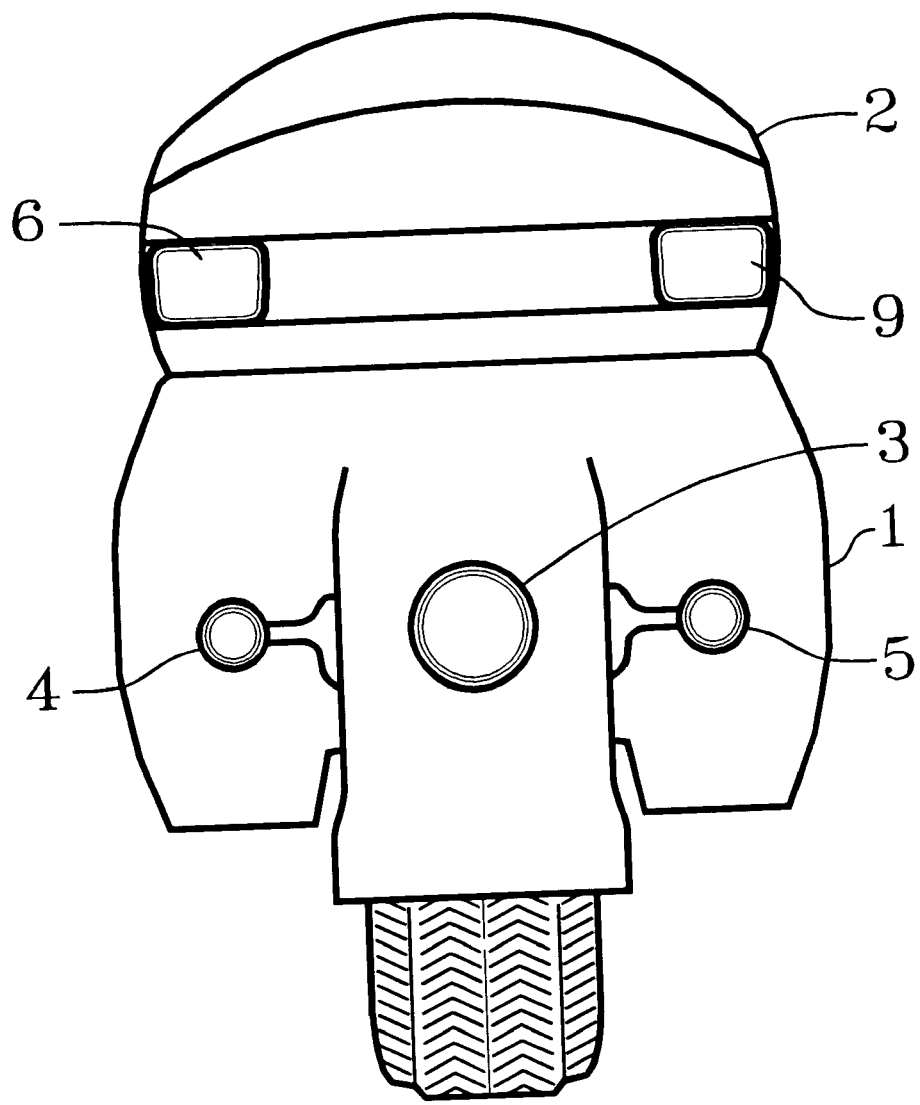
FIG. 1 shows the rear of a motorcycle equipped with my lights.

Referring now to FIG. 1, the motorcycle 1 has a trunk 2, a central brake lamp 3, and more or less standard turn signal lamps 4 and 5. In addition, the motorcycle is equipped with auxiliary brake lamps 6 and 9 which are placed on the sides of the back of the motorcycle.

The invention will be discussed with respect to three basic conditions: (1) where the brakes are applied (2) where a turn signal is applied, and (3) where both a turn signal and the brakes are applied.

In the first condition, where the brakes are applied, central brake lamp 3 and both of the auxiliary brake lamps 6 and 9 are activated continuously throughout the application of the brakes, thus giving drivers behind the motorcycle an excellent indication that the brakes are being applied. In the second condition, where a turn signal is applied, either lamps 4 and 6 or lamps 5 and 9 will blink so long as the left or right turn signal is applied. In the third condition, where both the brakes and a turn signal are applied at the same time, the central brake lamp 3 and the auxiliary brake lamp on the side opposite the turn will be activated continuously as long as the brakes are applied, while the appropriate turn signal pair—either lamps 4 and 6 or 5 and 9—will blink so long as the turn signal is applied, and, optionally, as will be seen below, for an additional short period of time such as one-half to three seconds. The flashing side auxiliary, which is 6 or 9, will remain de-energized or off.

Figure 2:
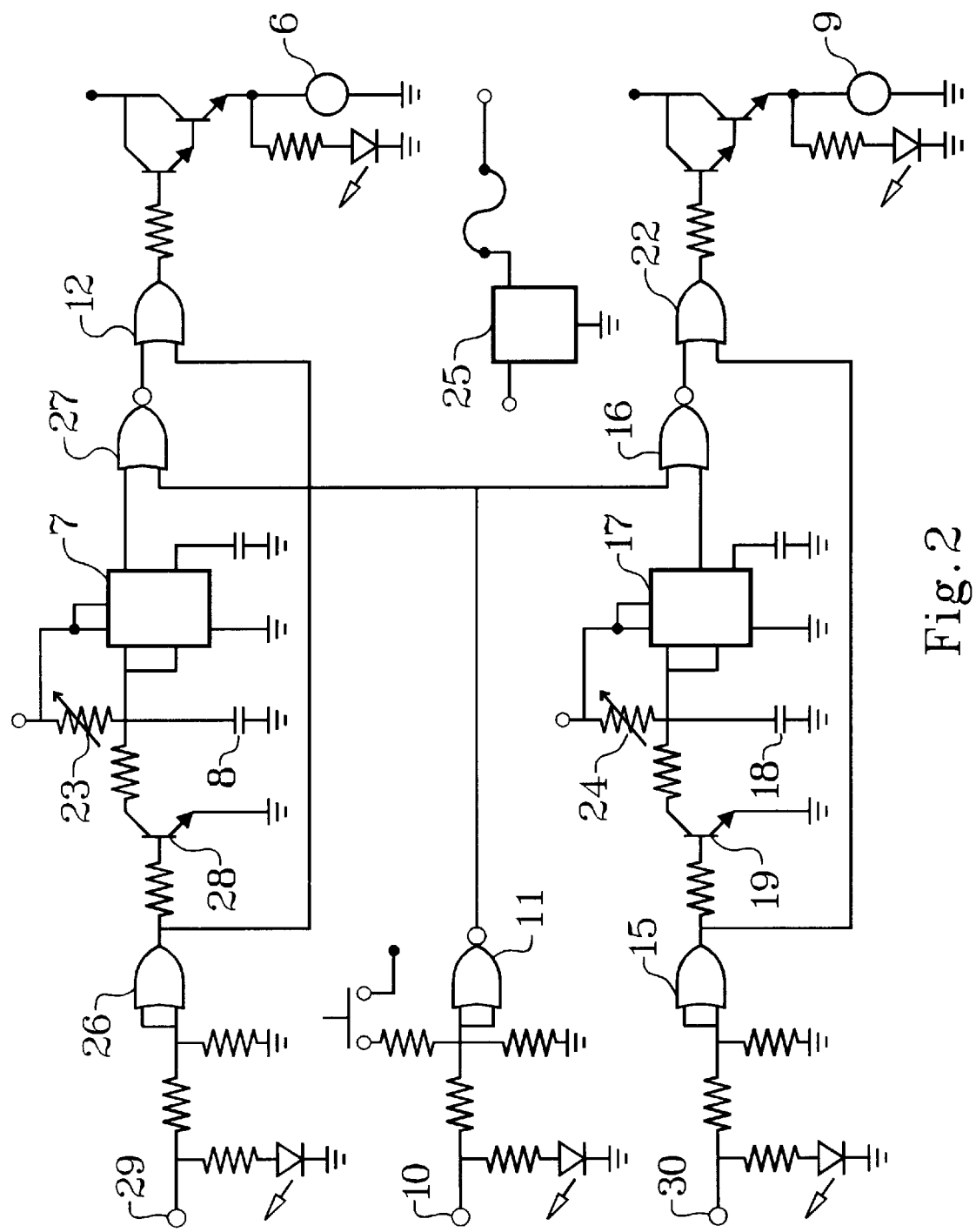
FIG. 2 is a circuit for operating my invention.

In FIG. 2, a preferred circuit is described for operation of the invention to achieve the objectives.

In the first condition, where the brakes are applied but a turn signal is not, a brake signal enters the circuit through input 10 and encounters NOR gate 11, which is used for signal isolation and signal conditioning. The low voltage output from NOR gate 11 when the brake is on is transmitted to NOR gates 27 and 16. The output of NOR gates 27 and 16 then goes high, driving OR gates 12 and 22 to illuminate lamps 6 and 9. Brake lamp 3 (FIG. 1) is operated directly by the brake signal entering at input 10 by a simple conventional connection not shown.

If there is no brake signal but a pulsed turn signal enters the circuit through input 29 or 30, (OR gate 26) or 15 is used for signal isolation and conditioning. The high pulsed outputs of nor gates 26 and 15 are divided and, since the circuits for inputs 29 and 30 are the same, the action of the circuit will be described with respect to a pulsed turn signal at input 29. The high output of (OR gate 26) goes directly to OR gate 12, which illuminates lamp 1 intermittently as energized by the pulsed input.

In the third condition, where both the turn signal and the brakes are applied, the pulsed signal through (OR gate 26) drives transistor 28, which discharges capacitor 8 to the input of timer 7, making the output of the timer 7 go high, disabling the brake signal at NOR gate 27. Thus the circuit normally permits the brake signal to operate until the turn signal is applied; at that point the timer interjects a high output to NOR gate 27, which interrupts the brake signal at OR gate 12, coming from NOR gate 11. The auxiliary brake lamp then becomes pulsed, in effect a turn signal.

It should be noted that the time constant of capacitor 8, controlled through charging resistor 23, should be longer than the period between pulses of the pulsed turn signal input. This will maintain a continuous high output from timer 7 to NOR gate 27, thus continuously disabling the brake signal, while the divided turn signal goes directly to OR gate 12 to operate lamp 6. The R-C time constant may be varied through charging resistor 23 but this will not be necessary if the periods between turn signal pulses are constant. Likewise, variable charging resistor 24 controls the time constant of capacitor 18; transistor 19, timer 17, NOR gate 16, and OR gate 22 all function to operate lamp 9 as counterpart transistor 28, timer 7, NOR gate 27, and OR gate 12 in the description just given of the operation of lamp 6.

I claim:

1. A brake and turn signal circuit comprising
   (a) a brake signal circuit including a brake signal input, a plurality of NOR gates, an output OR gate driven by each NOR gate, and means activated by each of said output OR gates for illuminating a brake lamp,
   (b) two turn signal circuits, each of said turn signal circuits being divided into (i) a direct route to one of said output OR gates, and (ii) a timing circuit for disabling at least one of said NOR gates while said turn signal is on.

2. A brake and turn signal circuit of claim 1 wherein said brake signal circuit has a NOR gate, an OR gate and a brake lamp for each side of a vehicle.

3. A brake and turn signal circuit of claim 1 wherein said turn signal circuit includes means for receiving a pulsed turn signal having predetermined periods between pulses, and means for generating pulses during said predetermined periods lasting at least as long as said predetermined periods, when said brake signal input is activated.

4. A brake and turn signal circuit of claim 1 wherein said timing circuit includes a capacitor having a transistor input, a charging resistor, and a timer connected to its output for controlling a NOR gate, said NOR gate having said brake signal as an input.

* * * * *